(12) United States Patent
Lee

(10) Patent No.: US 8,863,873 B2
(45) Date of Patent: Oct. 21, 2014

(54) IN-WHEEL MOTOR SYSTEM

(71) Applicant: Mando Corporation, Gyeonggi-do (KR)

(72) Inventor: Chung Seong Lee, Gyeonggi-Do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 36 days.

(21) Appl. No.: 13/656,385

(22) Filed: Oct. 19, 2012

(65) Prior Publication Data

US 2013/0099554 A1    Apr. 25, 2013

(30) Foreign Application Priority Data

Oct. 21, 2011    (KR) .................. 10-2011-0107811

(51) Int. Cl.
| | |
|---|---|
| *B60K 7/00* | (2006.01) |
| *B60K 17/04* | (2006.01) |
| *H02K 7/116* | (2006.01) |
| *H02K 7/102* | (2006.01) |

(52) U.S. Cl.
CPC ............ *B60K 7/0007* (2013.01); *B60K 17/046* (2013.01); *B60K 2007/0038* (2013.01); *H02K 7/116* (2013.01); *B60K 2007/0092* (2013.01); *H02K 7/102* (2013.01); *Y02T 10/641* (2013.01)
USPC ....................................................... 180/65.51

(58) Field of Classification Search
CPC .................................... B60K 1/00; B60K 7/00
USPC .............................. 180/65.51, 65.31, 65.6, 65.1
See application file for complete search history.

(56) References Cited

U.S. PATENT DOCUMENTS 5,087,229 A * 2/1992 Hewko et al. ............... 180/65.51
5,818,134 A * 10/1998 Yang et al. ....................... 310/78
(Continued)

FOREIGN PATENT DOCUMENTS

| JP | 2007-237834 A | 9/2007 |
|---|---|---|
| KR | 10-2010-0023217 A | 3/2010 |

OTHER PUBLICATIONS

Korean Office Action issued in Korean Patent Application No. KR 10-2011-0107811 dated Feb. 26, 2013.

*Primary Examiner* — Hau Phan
(74) *Attorney, Agent, or Firm* — McDermott Will & Emery LLP

(57) ABSTRACT

An in-wheel motor system capable of maximizing the efficiency in using a wheel space by improving a mounting structure thereof, the in-wheel motor system installed at a wheel of a vehicle to transmit a rotational force including an axle installed at the wheel of the wheel and rotating together with the wheel, an in-wheel motor mounted inside the wheel and provided with a rotor and a stator that are used to generate a rotational force to drive the wheel, the rotor, and the stator disposed to face each other while having an accommodation space thereinbetween, a cycloid decelerator installed at a center of the in-wheel motor, and provided with an output shaft to transmit a rotational force at a reduced speed from the in-wheel motor to the axle and an input shaft that passes through the in-wheel motor and rotates together with the rotor, a disc installed at one end portion of the input shaft that protrudes by passing through the in-wheel motor, and a disc brake configured to provide a braking force by pressing the disc, wherein the in-wheel motor and the cycloid decelerator are disposed in a space formed inside the wheel.

15 Claims, 5 Drawing Sheets

(56) References Cited

U.S. PATENT DOCUMENTS

| | | | |
|---|---|---|---|
| 7,216,731 B2 * | 5/2007 | Kakinami et al. | 180/65.51 |
| 7,628,727 B2 * | 12/2009 | Nagai et al. | 475/291 |
| 7,819,214 B2 * | 10/2010 | Mizutani et al. | 180/65.51 |
| 7,958,959 B2 * | 6/2011 | Yogo et al. | 180/65.51 |
| 8,157,036 B2 * | 4/2012 | Yogo et al. | 180/65.51 |
| 8,316,973 B2 * | 11/2012 | Walter et al. | 180/65.51 |
| 8,602,145 B2 * | 12/2013 | Su et al. | 180/65.51 |
| 2008/0070736 A1 | 3/2008 | Yoshino et al. | |

* cited by examiner

IN-WHEEL MOTOR SYSTEM

CROSS-REFERENCE TO RELATED APPLICATION

This application claims the benefit of Korean Patent Application No. 2011-0107811, filed on Oct. 21, 2011 in the Korean Intellectual Property Office, the disclosure of which is incorporated herein by reference.

BACKGROUND

1. Field

Embodiments of the present disclosure relate to an in-wheel motor system, and more particularly, to an in-wheel motor system capable of maximizing a spatial efficiency by improving a mounting structure thereof.

2. Description of the Related Art

In general, an in-wheel motor is a technology used for an electric vehicle using electricity as a driving source, and differently from a gasoline vehicle or a diesel vehicle in which a wheel is rotated by a power sequentially transmitted through an engine, a transmission, and a driving shaft, is an apparatus enabling a power to be delivered to a wheel through a motor disposed inside a rim of the wheel.

By using the in-wheel motor, a power transmission apparatus, such as an engine, a transmission, or a differential gear, is omitted, the weight of the vehicle is reduced and a wheel is independently controlled, while the vehicle running performance is improved and the energy loss in a power transmission process is reduced.

FIG. 1 is a perspective view illustrating a state of having a conventional in-wheel motor system installed at a wheel, and FIG. 2 is an assembled cross-sectional view of FIG. 1.

Referring to FIGS. 1 and 2, an in-wheel motor system is installed at a wheel 10 from an inside a vehicle to an outside the vehicle. In detail, the in-wheel motor system is provided with an axle 20 installed at the center of a wheel 10 and rotating together with the wheel 10, a decelerator 30 transmitting a rotational force of an in-wheel motor 40 at a reduced speed, the in-wheel motor 40 connected to the decelerator 30, and a disc brake 60 to generate a braking force by pressing a disc 50 provided between the wheel 10 and the axle 20.

The in-wheel motor system needs to have the decelerator 30 to increase a torque of the in-wheel motor 40, and in addition, a brake system, that is, the disc 50 and the disc brake 60, needs to be installed inside the wheel 10. Accordingly, if the in-wheel motor system as such is coupled on the wheel 10, the spatial efficiency is lowered and an unsprung mass is increased, while degrading a vehicle running performance.

In particular, if the in-wheel motor system is mounted on the wheel 10, the disc 50, the disc brake 60, and the decelerator 30 are disposed inside the wheel 10. In this case, due to the spatial limitation of the inside the wheel 10, the in-wheel motor 40 protrudes toward the outer side of the wheel 10, that is, toward an interior of the vehicle, so that the in-wheel motor 40 may be broken by impact with an external object.

SUMMARY

Therefore, it is an aspect of the present disclosure to provide an in-wheel motor system capable of preventing a motor from being broken by maximizing the spatial efficiency inside a wheel, and capable of reducing an unsprung mass by having miniaturized and compact structure thereof, thereby improving the vehicle running performance.

Additional aspects of the disclosure will be set forth in part in the description which follows and, in part, will be obvious from the description, or may be learned by practice of the disclosure.

In accordance with one aspect of the present disclosure, an in-wheel motor system installed at a wheel of a vehicle to transmit a rotational force, the in-wheel motor system includes an axle, an in-wheel motor, a cycloid decelerator, a disc, and a disc brake. The axle may be installed at the wheel of the wheel and rotating together with the wheel. The in-wheel motor may be mounted inside the wheel and provided with a rotor and a stator that are used to generate a rotational force to drive the wheel, and the rotor, and the stator may be disposed to face each other while having an accommodation space therebetween. The cycloid decelerator may be installed at a center of the in-wheel motor, and provided with an output shaft to transmit a rotational force at a reduced speed from the in-wheel motor to the axle and an input shaft that passes through the in-wheel motor and rotates together with the rotor. The disc may be installed at one end portion of the input shaft that protrudes by passing through the in-wheel motor. The disc brake may be configured to provide a braking force by pressing the disc. The in-wheel motor and the cycloid decelerator may be disposed in a space formed inside the wheel.

The cycloid decelerator may include a pair of eccentric bearings, a pair of cycloid discs, a ring gear housing, and the output shaft. The pair of eccentric bearings is connected to the input shaft rotating together with the rotor to eccentrically transmit a rotation. The pair of cycloid discs each may be installed at the eccentric bearings, respectively, to have the eccentric bearing positioned at a center thereof, each of the pair of cycloid discs provided with a plurality of through holes in a radial direction from a center thereof and configured to eccentrically rotate. The ring gear housing may be installed to surround the pair of cycloid discs and have a roller installed along an inner circumferential surface thereof, the roller making contact with an outer circumferential surface of the cycloid disc such that the cycloid disc performs a revolution and a rotation. The output shaft may be rotatably coupled to the axle, and having a plurality of output pins installed thereto, the plurality of output pins inserted into the plurality of through-holes, respectively, to compensate for an eccentricity of a center of the cycloid disc.

An output housing having a hollowness allowing the output shaft to pass therethrough and an input housing having a hollowness allowing the input shaft to pass therethrough may be further provided at a front side of the output shaft and a rear side of the ring gear housing, respectively.

The output housing, the input housing and the ring gear housing may be coupled to one another through a fastening bolt, and the fastening bolt may be fastened to the in-wheel motor to prevent the ring gear housing from being rotated.

A hub bearing may be installed between the output housing and the axle.

The input shaft may be provided in a predetermined length, and have a middle portion thereof inserted into the rotor so as to rotate together with the rotor by an input shaft fixing nut that is installed at each of a front side and a rear side of the rotor while being in close contact.

The other end portion of the input shaft may be provided with a key protruding from an outer circumferential surface thereof, and the eccentric bearing may be provided with a key groove matching to the key in shape.

A tip of the other end portion of the input shaft may be provided with a connecting ring to prevent the eccentric bearing from being separated from the input shaft.

The disc may be fixed to a tip of the one end portion of the input shaft by a disc fixing nut such that the disc rotates together with the input shaft.

A ball bearing may be provided between the input shaft and the output shaft.

The output shaft may be provided in a predetermined length and have a shaft portion coupled to the axle and a flange portion radially extending from an end portion of the shaft portion, and the plurality of output pins may be installed at a rear side of the flange portion.

A rubber ring may be interposed between the pair of cycloid discs.

The roller may be installed at a ring pin rotatably installed at the ring gear housing, so as to make contact with the outer circumferential surface of the cycloid disc.

The in-wheel motor may include, a front housing, a rear housing, a rotor, a stator and a three-phase power port. The front housing may be provided at a center thereof with an opening portion. The rear housing may be assembled to the front housing through a bolt to form an accommodation space therein. The rotor may be disposed in the accommodation space, and have a plurality of magnets installed along an outer circumferential surface thereof while being spaced apart from each other by a predetermined interval. The stator may be spaced apart from the outer circumferential surface of the rotor to surround the rotor. The stator is wound by a coil. The three-phase power port may be provided at a rear side wall of the rear housing to supply the coil with a power.

The rear side wall of the rear housing may be provided with an installation portion at which the disc brake is installed.

The input shaft may pass through the installation portion, and a bearing may be installed between the installation portion and the input shaft.

As described above, the design flexibility is improved by guaranteeing a space for a cycloid decelerator and a motor.

In addition, a motor is mounted to be installed at an inner side of the wheel, so that the motor is prevented from being broken while being protected from an impact of an external substance.

In addition, the in-wheel motor system has a miniaturized and compact structure so as to reduce an unsprung mass, thereby improving the safety in driving a vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
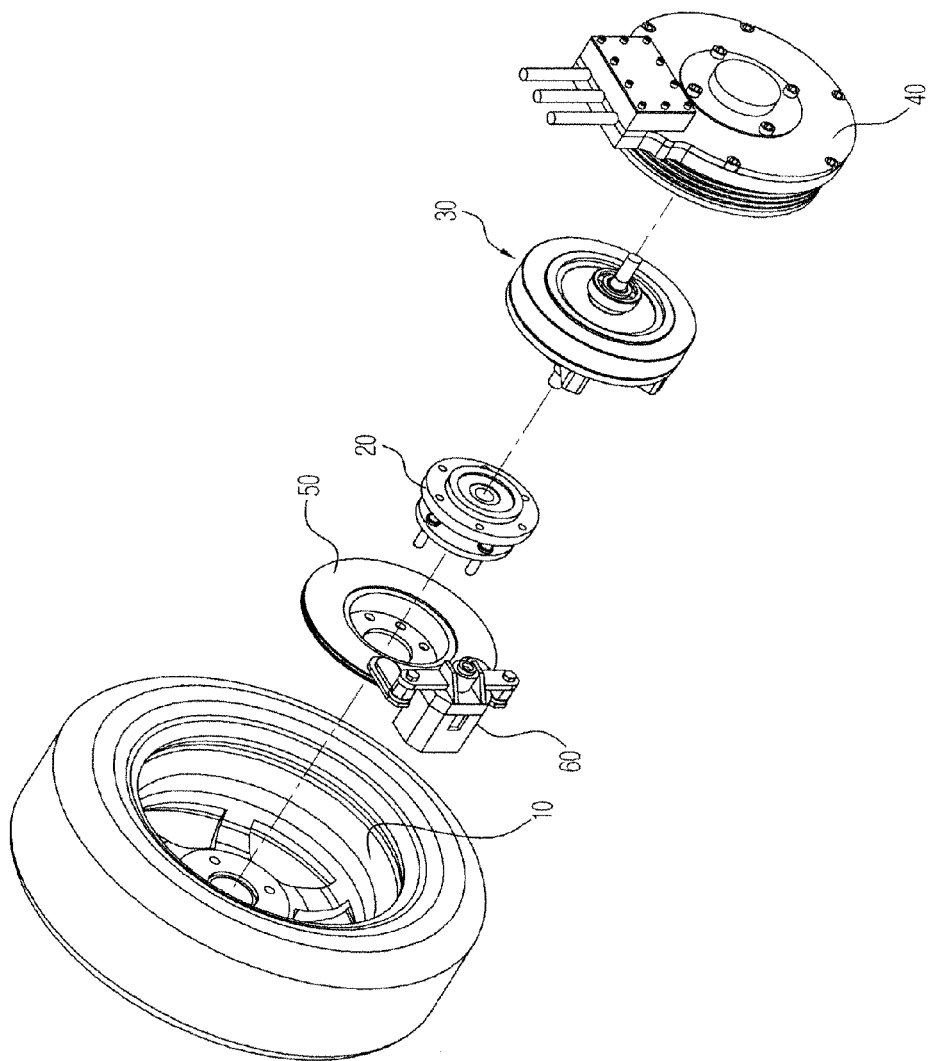
FIG. 1 is a perspective view illustrating a conventional in-wheel motor system.
Figure 2:
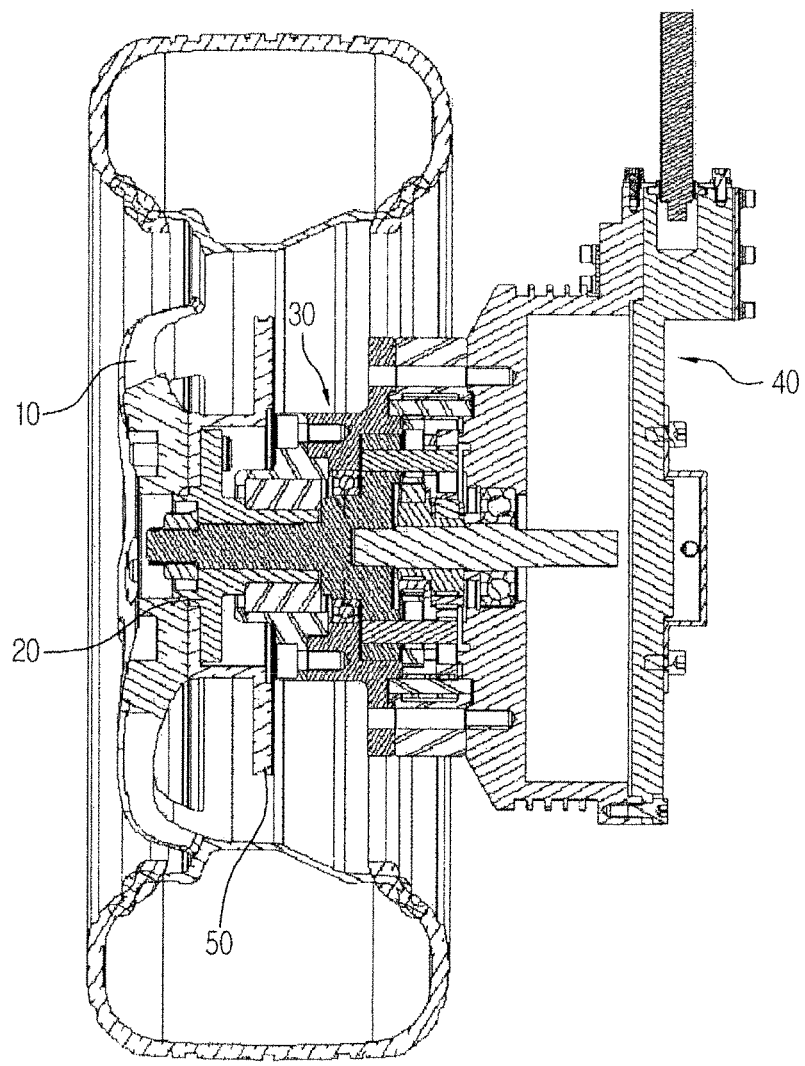
FIG. 2 is an assembled cross-sectional view of FIG. 1.

Reference will now be made in detail to the embodiments of the present disclosure, examples of which are illustrated in the accompanying drawings, wherein like reference numerals refer to like elements throughout.

Figure 3:
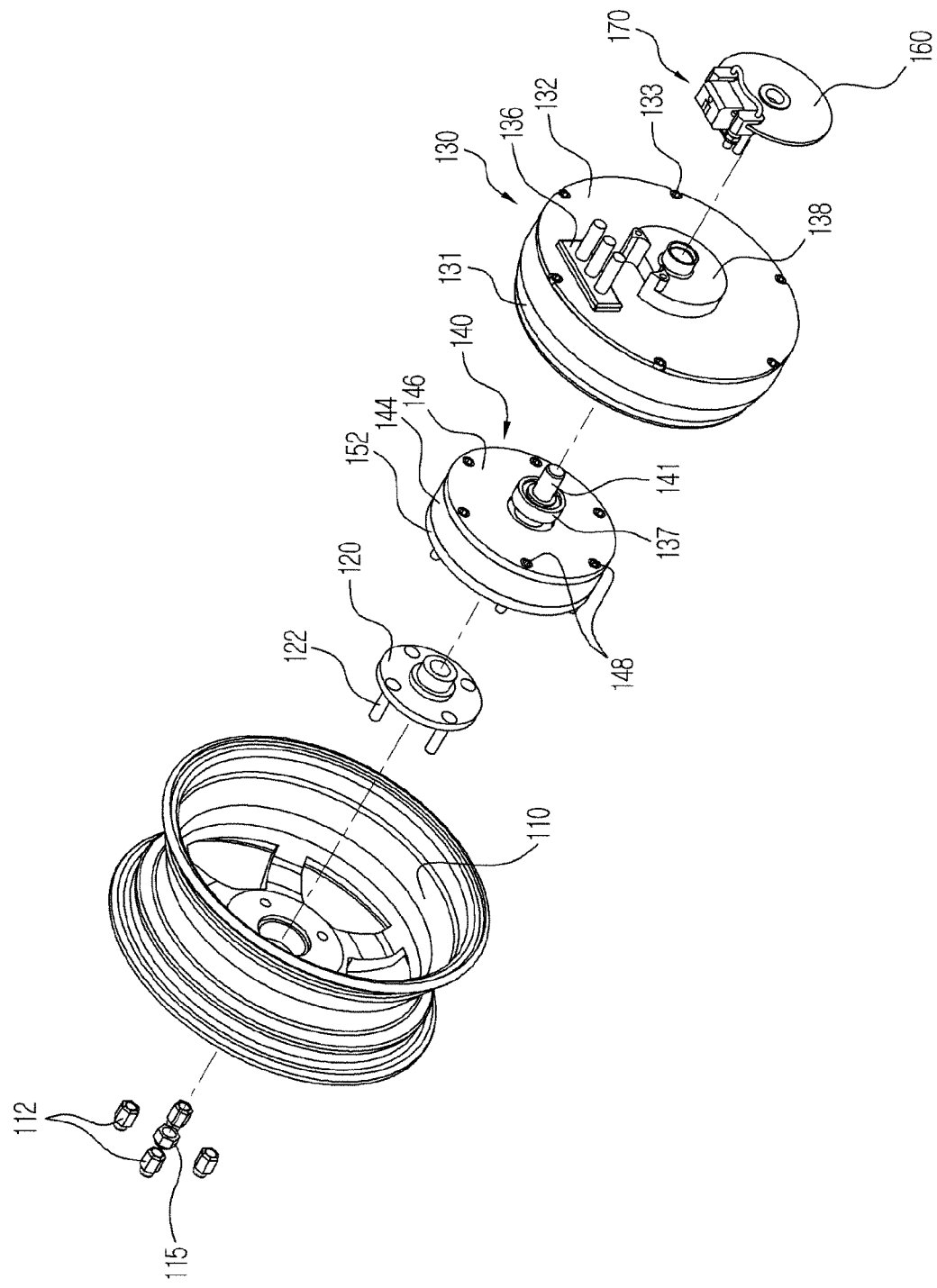
FIG. 3 is an exploded perspective view illustrating an in-wheel motor system in accordance with an embodiment of the present disclosure.
Figure 4:
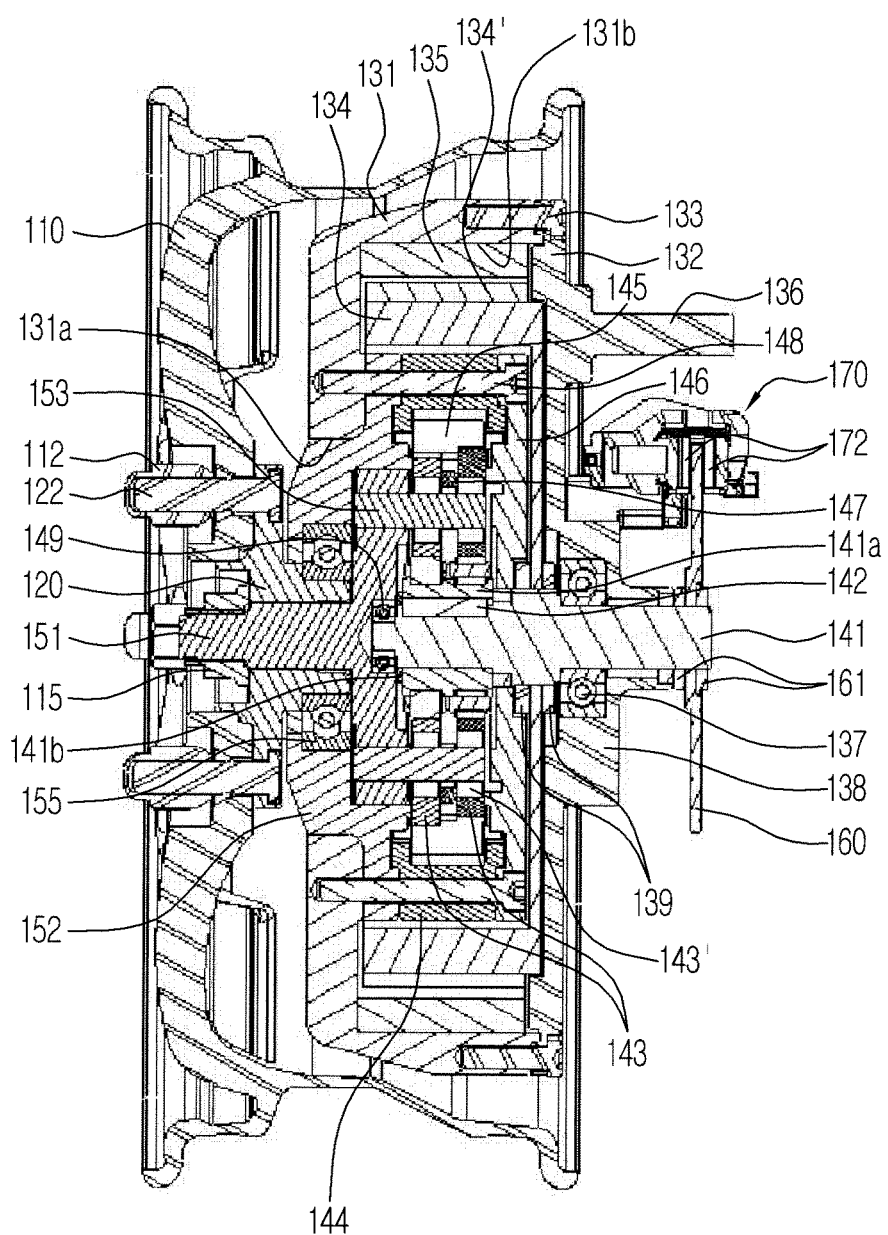
FIG. 4 is an assembled cross-sectional view of FIG. 3.

FIG. 3 is an exploded perspective view illustrating an in-wheel motor system in accordance with an embodiment of the present disclosure. FIG. 4 is an assembled cross-sectional view of FIG. 3.

Referring to FIGS. 3 and 4, an in-wheel motor system includes an axle 120 rotating together with a wheel 110, an in-wheel motor 130 to generate a rotational force to drive the wheel 110, a cycloid decelerator 140 to transmit a rotational force at a reduced speed, a disc 160 rotated by the in-wheel motor 130 and a disc brake 170 to provide a braking force by pressing the disc 160.

The axle 120 is coupled to the wheel 110 to rotate together with the wheel 110. The axle 120 as such is provided with a plurality of axle bolts 122 radially installed from a center thereof. The axle bolt 122, after passes through the wheel 110, is coupled to the wheel 110 by a wheel nut 112.

The in-wheel motor 130 is an electric motor provided with a rotor 134 and a stator 135, and is installed inside the wheel 110 to generate a driving force to drive a wheel. In detail, the in-wheel motor 130 includes a front housing 131 and a rear housing 132 assembled to each other through a bolt 133, and has the rotor 134 and the stator disposed to face each other in an accommodation space 131b formed through the assembly of the front housing 131 and the rear housing 132. A plurality of magnets 134' are installed while being spaced apart from each other by a predetermined interval along an outer circumferential surface of the rotor 134. The stator 135 configured to surround the rotor 134 while being spaced apart from the rotor 134 is wound by a coil (not shown). If a power is applied to the coil, a repulsive force and an attractive force act between the magnet 134' and the coil, so that the rotor 134 is rotated.

Meanwhile, the front side housing 131 is provided at a center thereof with an opening portion 131a. The opening portion 131a serves to expose a portion of the cycloid decelerator 140, which is to be described later, when the cycloid decelerator 140 is installed in the accommodation space 131b of the in-wheel motor 130.

A three-phase power port 136 is provided at a rear side wall of the rear housing 132 to supply the coil with a power. In addition, an installation portion 138 is provided at the rear side wall of the rear housing 136 such that the disc brake 170 is installed at the installation portion 138. The installation portion 138 protrudes from the rear side wall, and has an input shaft 141, which is to be described later, passing therethrough and installed thereto. That is, as shown in the drawings, the disc 160 is installed at one end portion of the input shaft 141 passing through the installation portion 138, so the disc brake 170 is installed adjacent to an upper side of the installation portion 138 so as to press the disc 160. In this case, a bearing 137 is installed between the input shaft 141 and the installation portion 138. In addition, the disc 160 installed at the one end portion of the input shaft 141 is fixed by a pair of disc fixing nuts 161, which are installed at a front side and at a rear side of the disc 160, respectively, so that the disc 160 rotates together with the input shaft 141.

Meanwhile, the disc 160 and the disc brake 170 correspond to a brake apparatus that is generally used for braking a vehicle, and thus a detailed description thereof will be omitted. Reference numeral '172' represents a pad configured to provide a braking force by pressing both lateral sides of a disc.

Figure 5:
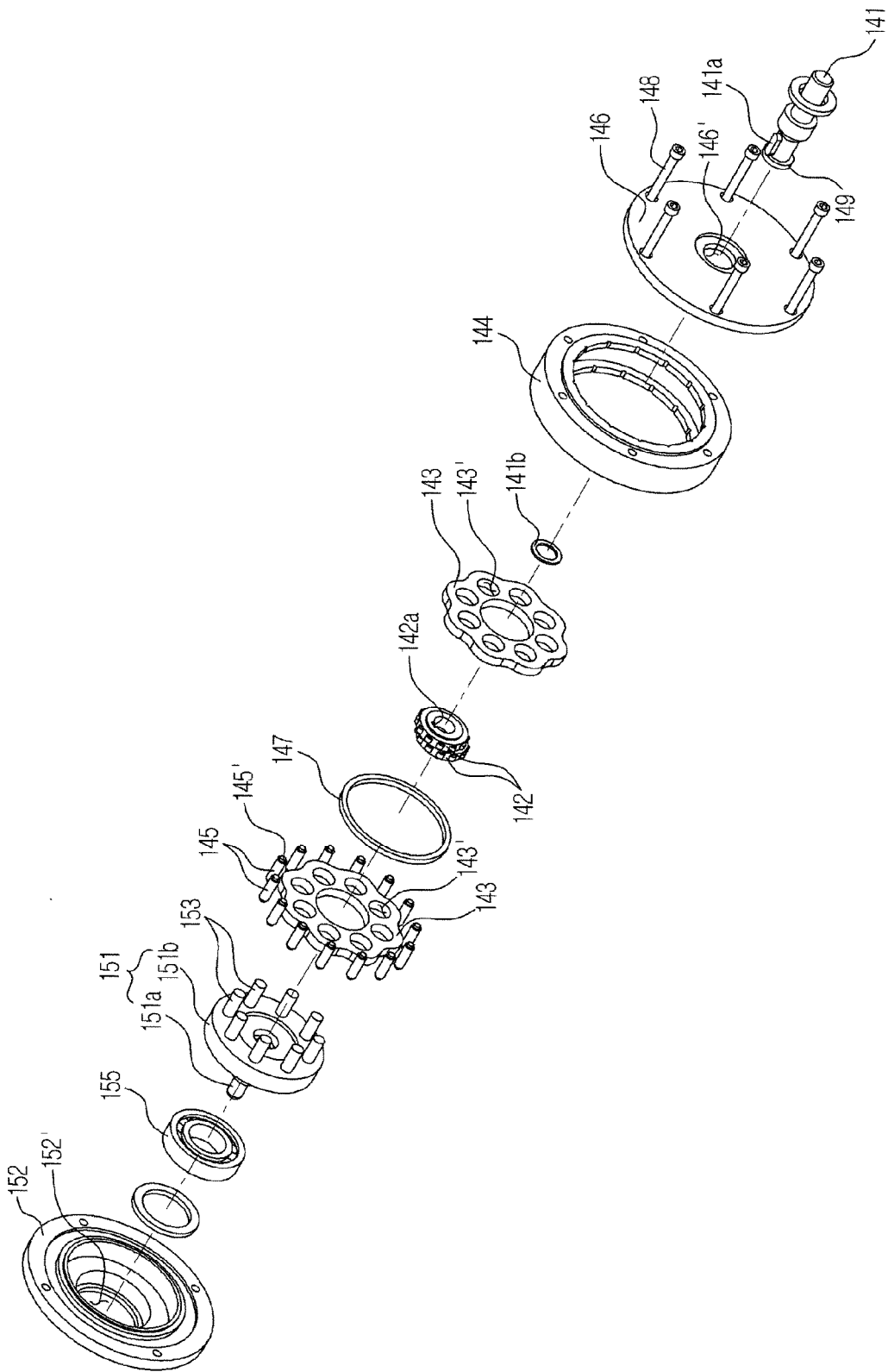
FIG. 5 is an exploded perspective view illustrating a cycloid decelerator provided in the in-wheel motor system in accordance with the embodiment of the present disclosure.

The cycloid decelerator 140 in accordance with one embodiment of the present disclosure includes the input shaft 141 coupled to the rotor 134, a pair of eccentric bearings 142 connected to the input shaft 141 to eccentrically transmit a rotation, a pair of cycloid discs 143 configured to be eccentrically rotated by the eccentric bearing 142, a ring gear housing 144 to which a roller 145 is installed such that the cycloid disc 143 is revolved or rotated, and an output shaft 151 having a plurality of output pins 153 installed thereto, the plurality of output pins 153 inserted into a plurality of through-holes 143', respectively (see FIG. 5).

The cycloid decelerator 140 as such is configured to amplify a rotational torque of the in-wheel motor 130, and is disposed in the accommodation space 131b of the in-wheel motor 130.

The input shaft 141 is provided in a predetermined length, and is installed by passing through the rotor 134. As shown in the drawings, the input shaft 141 has a center portion thereof inserted into the rotor 134, and is fixed by an input shaft fixing nut 139, which is installed at a front side and at a rear side of the rotor 134, respectively, while being in close contact, so as to rotate with the rotor 134. One end portion of the input shaft 141 passes through the rear housing 132 of the in-wheel motor 130 such that the disc 160 is installed at the one end portion of the input shaft 141 as described above. The other end portion of the input shaft 141 is coupled to the pair of eccentric bearings 142. A key 141a protrudes from an outer circumferential surface of the other end portion of the input shaft 14, and a key groove 142' matching to the key 141a in shape is formed in the eccentric bearing 142.

Meanwhile, a connection ring 141b is installed at a tip of the other end portion of the input shaft 141 to prevent the eccentric bearing 142 from being separated from the input shaft 141.

The pair of eccentric bearings 142 is provided at a position away from the center thereof with a hole to which the input shaft 141 is insertedly coupled, so as to enable an eccentric rotation. The eccentric bearings 142 are connected to the input shaft 141 while being spaced apart from each other.

The cycloid disc 143 is installed to the eccentric bearing 142 to have the eccentric bearing 142 positioned at a center thereof. That is, the pair of cycloid discs 143 is configured to be eccentrically rotated by the eccentric bearing 142.

The plurality of through holes 143' are radially formed from the center of the cycloid disc 143. As shown in the drawings, the cycloid disc 143 has eight through-holes 143' spaced apart from each other by a predetermined interval. Here, the number of the through-holes 143' may be selectively increased/decreased depending on the capacity, and the output pin 153 is inserted into the through-hole to compensate for the eccentricity of the center of the cycloid disc 143.

Meanwhile, a lobe having a cycloid curve is formed at an outer circumferential surface of the cycloid disc 143 in a continuous manner. A rubber ring 147 is disposed between the pair of cycloid discs 143 to have the pair of cycloid discs 143 spaced apart from each other.

The ring gear housing 144 is configured to surround the cycloid disc 143 while being spaced apart from the cycloid disc 143 by a predetermined interval. A plurality of rollers 145, which make contact with the outer circumferential surface of the cycloid disc 143, that is, the lobe, are installed at an inner circumferential surface of the ring gear housing 144, so that the cycloid disc 143 performs a revolution and a rotation. In detail, the rollers 145 are installed at ring pins 145' that are rotatably installed along the inner circumferential surface of the ring gear housing 144 while being spaced apart from each other by a predetermined interval, and make contact with the outer circumferential surface of the pair of cycloid disc 143. In this case, the ring gear housing 144 is prevented from being rotated while being fixed to the in-wheel motor 130 through a fastening bolt 148, which is to be described later.

The output shaft 151 receives a rotational force at a reduced speed from the cycloid disc 143, and transmits the rotational force to the axle 120. The output shaft 151 is provided in a predetermined length, and has a shaft portion 151a coupled to the axle 120 and a flange portion 151b radially extending from an end portion of the shaft portion 151a. In this case, the plurality of output pins 153 are installed at a rear side of the flange portion 141, such that the plurality of output pins 153 are inserted into the plurality of through-holes 143', respectively. The plurality of output pins 153 are provided in the same number as that of the through-holes 143'.

In addition, an output housing 152 having a hollowness allowing the output shaft 151 to pass therethrough and an input housing 146 having a hollowness allowing the input shaft 141 to pass therethrough are further provided at a front side of the output shaft 151 and a rear side of the ring gear housing 144, respectively. The output housing 152 and the input housing 146 serve to protect the components of the cycloid decelerator 140. In this case, the output housing 152, the input housing 146 and the ring gear 144 are coupled to one another through a fastening bolt 148. The fastening bolt 149 is coupled to the front housing 131 of the in-wheel motor 130, thereby preventing the ring gear housing 144 from being rotated.

Meanwhile, reference numeral '149' represents a ball bearing that is provided between the input shaft 141 and the output shaft 151 to prevent a rotational force of the input shaft 141 from being directly transmitted to the output shaft 151. Reference numeral '155' represents a hub bearing installed between an output housing 152 and the axle 120. Reference numeral '115' represents a flange nut coupled to an end portion of the output shaft 151.

As for the cycloid decelerator 140, if the pair of eccentric bearings 142 connected to the input shaft 141, which rotates together with the rotor 134, is rotated, the pair of cycloid discs 143 performs a revolution and a rotation while making contact with the roller 145 at an inside of the ring gear housing 144. For example, if the eccentric bearing 142 transmits a rotational force to the cycloid disc 143 in a clockwise direction, the cycloid disc 143 revolves in a clockwise direction while rotating in a counter-clockwise direction in an interlocked manner with the roller 145. That is, a torque of the cycloid disc 143 corresponds to a rate of rotation of the cycloid disc 143 that is output at a reduced speed. Accordingly, the reduction in speed is transmitted to the axle 120 through the output shaft 151. In this case, the output pin 153 is connected to the through-hole 143' of the cycloid disc 143 to compensate for the vibration due to the revolution, so that the axle 120 having received the rotational force through the output shaft 151 rotates in the same line with the shaft portion 151a.

As a result, a structure to transmit a driving force of the in-wheel motor 130, which is being amplified through the cycloid decelerator 140 to the axle 120, is provided in a serial scheme, and the cycloid decelerator 140 is mounted at an inside the in-wheel motor 130, and the in-wheel motor 130 is positioned at an inside the wheel 110, thereby reducing the entire size of the in-wheel motor system when compared to the conventional in-wheel motor. Accordingly, the in-wheel motor 130 is prevented from being broken due to external impact, an unsprung mass is reduced to improve the vehicle driving performance, an easy installation is ensured, and the efficiency in using an installation space is enhanced to improve the design flexibility.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An in-wheel motor system installed at a wheel of a vehicle to transmit a rotational force, the in-wheel motor system comprising:
   an axle installed at the wheel of the vehicle and rotating together with the wheel;
   an in-wheel motor mounted inside the wheel and provided with a rotor and a stator that are used to generate a rotational force to drive the wheel, the rotor, and the stator disposed to face each other while having an accommodation space therebetween;
   a cycloid decelerator installed at a center of the in-wheel motor, and provided with an output shaft to transmit a rotational force at a reduced speed from the in-wheel motor to the axle and an input shaft that passes through the in-wheel motor and rotates together with the rotor;
   a disc installed at one end portion of the input shaft that protrudes by passing through the in-wheel motor; and
   a disc brake configured to provide a braking force by pressing the disc,
   wherein the in-wheel motor and the cycloid decelerator are disposed in a space formed inside the wheel, and
   wherein the cycloid decelerator comprises:
      a pair of eccentric bearings connected to the input shaft rotating together with the rotor to eccentrically transmit a rotation;
      a pair of cycloid discs each installed at the eccentric bearings, respectively, to have the eccentric bearing positioned at a center thereof, each of the pair of cycloid discs provided with a plurality of through holes in a radial direction from a center thereof and configured to eccentrically rotate;
      a ring gear housing installed to surround the pair of cycloid discs and having a roller installed along an inner circumferential surface thereof, the roller making contact with an outer circumferential surface of the cycloid disc such that the cycloid disc performs a revolution and a rotation; and
      the output shaft rotatably coupled to the axle, and having a plurality of output pins installed thereto, the plurality of output pins inserted into the plurality of through-holes, respectively, to compensate for an eccentricity of a center of the cycloid disc.

2. The in-wheel motor system of claim 1, wherein an output housing having a hollowness allowing the output shaft to pass therethrough and an input housing having a hollowness allowing the input shaft to pass therethrough are further provided at a front side of the output shaft and a rear side of the ring gear housing, respectively.

3. The in-wheel motor system of claim 2, wherein the output housing, the input housing and the ring gear housing are coupled to one another through a fastening bolt, and the fastening bolt is fastened to the in-wheel motor to prevent the ring gear housing from being rotated.

4. The in-wheel motor system of claim 2, wherein a hub bearing is installed between the output housing and the axle.

5. The in-wheel motor system of claim 1, wherein the input shaft is provided in a predetermined length, and has a middle portion thereof inserted into the rotor so as to rotate together with the rotor by an input shaft fixing nut that is installed at each of a front side and a rear side of the rotor while being in close contact.

6. The in-wheel motor system of claim 5, wherein the other end portion of the input shaft is provided with a key protruding from an outer circumferential surface thereof, and the eccentric bearing is provided with a key groove matching to the key in shape.

7. The in-wheel motor system of claim 5, wherein a tip of the other end portion of the input shaft is provided with a connecting ring to prevent the eccentric bearing from being separated from the input shaft.

8. The in-wheel motor system of claim 5, wherein the disc is fixed to a tip of the one end portion of the input shaft by a disc fixing nut such that the disc rotates together with the input shaft.

9. The in-wheel motor system of claim 1, wherein a ball bearing is provided between the input shaft and the output shaft.

10. The in-wheel motor system of claim 1, wherein the output shaft is provided in a predetermined length and having a shaft portion coupled to the axle and a flange portion radially extending from an end portion of the shaft portion, and the plurality of output pins are installed at a rear side of the flange portion.

11. The in-wheel motor system of claim 1, wherein a rubber ring is interposed between the pair of cycloid discs.

12. The in-wheel motor system of claim 1, wherein the roller is installed at a ring pin rotatably installed at the ring gear housing, so as to make contact with the outer circumferential surface of the cycloid disc.

13. The in-wheel motor system of claim 1, wherein the in-wheel motor comprises:
   a front housing provided at a center thereof with an opening portion;
   a rear housing assembled to the front housing through a bolt to form an accommodation space therein;
   a rotor disposed in the accommodation space, and having a plurality of magnets installed along an outer circumferential surface thereof while being spaced apart from each other by a predetermined interval;
   a stator spaced apart from the outer circumferential surface of the rotor to surround the rotor, the stator wound by a coil; and
   a three-phase power port provided at a rear side wall of the rear housing to supply the coil with a power.

14. The in-wheel motor system of claim 13, wherein the rear side wall of the rear housing is provided with an installation portion at which the disc brake is installed.

15. The in-wheel motor system of claim 14, wherein the input shaft passes through the installation portion, and a bearing is installed between the installation portion and the input shaft.

* * * * *